United States Patent
Johansson et al.

(10) Patent No.: US 10,004,099 B2
(45) Date of Patent: Jun. 19, 2018

(54) EFFICIENT DISCONTINUOUS RECEPTION IN A MOBILE NETWORK

(71) Applicant: MEDIATEK INC., Hsinchu (TW)

(72) Inventors: Johan Johansson, Kungsangen (SE); Chia-Chun Hsu, Taipei (TW); Li-Chuan Tseng, Taipei (TW)

(73) Assignee: MEDIATEK INC., HsinChu (TW)

( * ) Notice: Subject to any disclaimer, the term of this patent is extended or adjusted under 35 U.S.C. 154(b) by 24 days.

(21) Appl. No.: 15/155,082

(22) Filed: May 16, 2016

(65) Prior Publication Data

US 2016/0338143 A1    Nov. 17, 2016

Related U.S. Application Data (60) Provisional application No. 62/162,608, filed on May 15, 2015.

(51) Int. Cl.
  *G08C 17/00*    (2006.01)
  *H04W 76/04*    (2009.01)
  *H04W 52/02*    (2009.01)

(52) U.S. Cl.
  CPC ..... *H04W 76/048* (2013.01); *H04W 52/0225* (2013.01); *Y02D 70/00* (2018.01);
  (Continued)

(58) Field of Classification Search
  CPC .................................................. H04W 76/048
  (Continued)

(56) References Cited

U.S. PATENT DOCUMENTS

| 7,085,294 B2 * | 8/2006 | Longoni | H04B 7/2681 370/509 |
| 2001/0046240 A1 * | 11/2001 | Longoni | H04B 7/2681 370/503 |

(Continued)

FOREIGN PATENT DOCUMENTS

| WO | WO2014168537 A1 | 10/2014 |
| WO | WO2016022651 A1 | 2/2016 |
| WO | WO2016022748 A1 | 2/2016 |

OTHER PUBLICATIONS

EPO, Search Report for the EP patent application 16169895.6 dated Oct. 6, 2016 (8 pages).
(Continued)

*Primary Examiner* — Samina Choudhry
(74) *Attorney, Agent, or Firm* — Imperium Patent Works; Mark Marrello; Zheng Jin (57) ABSTRACT

A method of extended DRX paging includes a base station that transmits extended DRX configuration information and a User Equipment (UE) receives the extended DRX configuration from the base station. The UE determines a first number of frames that are included in a hyper-frame based at least in part on the extended DRX configuration information and selects a hyper-frame number. The hyper-frame number is based at least in part on the extended DRX configuration information. The UE maintains a hyper-frame count and the hyper-frame count is incremented after each hyper-frame. The UE then goes into sleep mode and the UE determines a wake up time before a standard DRX cycle that occurs during the selected hyper-frame. The UE may also determine a first wake up time and a second wake up time based on the selected hyper-frame number and synchronization error between a first cell and a second cell.

13 Claims, 6 Drawing Sheets

(52) U.S. Cl.
CPC ........ *Y02D 70/1262* (2018.01); *Y02D 70/164* (2018.01); *Y02D 70/24* (2018.01)

(58) Field of Classification Search
USPC ........................................................ 370/311
See application file for complete search history.

(56) References Cited

U.S. PATENT DOCUMENTS

| | | | |
|---|---|---|---|
| 2013/0203452 A1* | 8/2013 | Awoniyi | H04W 52/0203 455/500 |
| 2015/0271675 A1* | 9/2015 | Cheng | H04W 8/005 455/410 |
| 2016/0044578 A1 | 2/2016 | Vajapeyam et al. | 379/252 |
| 2016/0044605 A1* | 2/2016 | Vajapeyam | H04W 52/322 370/311 |
| 2016/0050624 A1 | 2/2016 | Tirronen et al. | 370/311 |
| 2016/0094958 A1* | 3/2016 | Thakur | H04W 4/08 370/338 |

OTHER PUBLICATIONS

3GPP TSG-RAN WG2 Meeting #90bis R2-152342, Qualcomm Incorporated et al., Design Consideration for Extended DRX in LTE, Fukuoka, Japan dated May 25-29, 2015 (6 pages).

* cited by examiner

HYPER-FRAME STRUCTURE

FIG. 3

EXTENDED DRX WAKE UP CYCLE

FIG. 4

EXTENDED DRX SYNCHRONIZATION

FIG. 5

FRAME SYNCHRONIZATION BETWEEN NETWORK CELLS

EFFICIENT DISCONTINUOUS RECEPTION IN A MOBILE NETWORK

CROSS REFERENCE TO RELATED APPLICATIONS

This application claims priority under 35 U.S.C. § 119 from U.S. Provisional Application No. 62/162,608 entitled, "EFFICIENT DISCONTINUOUS RECEPTION" filed on May 15, 2015; the subject matter of which is incorporated herein by reference.

TECHNICAL FIELD

The disclosed embodiments relate generally to wireless communication, and, more particularly, to achieving longer sleep time for an User Equipment (UE) using Hyper-frame paging.

BACKGROUND

Third generation partnership project (3GPP) and Long Term Evolution (LTE) mobile telecommunication systems provide high data rate, lower latency and improved system performances. With the rapid development of "Internet of Things" (IOT) and other new user equipment (UE), the demand for supporting machine communications increases exponentially. In 3GPP systems the existing Discontinuous Reception (DRX) cycle in idle and connected mode an UE is required to wake up at least once every second. However, some types of UEs may be able to tolerate large delays between sequential communications. For these "delay tolerant" UEs, much greater power efficiency may be achieved by increasing the duration between sequential UE wake up events.

Improvements and enhancements are needed to deploy a network in which delay tolerant UEs can reliably connect to a network with an increased duration between sequential wake up events.

SUMMARY

Methods and apparatus are provided for achieving longer sleep time for a User Equipment (UE) using Hyper-frame paging.

In one novel aspect, a method of extended DRX paging includes a base station that transmits extended DRX configuration information and a User Equipment (UE) receives the extended DRX configuration from the base station. The UE determines a first number of frames that are included in a hyper-frame based at least in part on the extended DRX configuration information and selects a hyper-frame number. The hyper-frame number is based at least in part on the extended DRX configuration information. The UE maintains a hyper-frame count and the hyper-frame count is incremented after each hyper-frame. The UE then goes into sleep mode and the UE determines a wake up time before a standard DRX cycle that occurs during the selected hyper-frame.

In one example, the extended DRX configuration information includes the number of frames that are included in the hyper-frame.

In another example, a calculation of the selected hyper-frame number includes a modulo calculation using an UE identity.

In a third example, legacy DRX configuration is communicated along with the extended DRX configuration information to the UE from the base station.

In a second novel aspect, a method of extended DRX paging includes a base station that transmits extended DRX configuration information and a User Equipment (UE) that receives the extended DRX configuration from the base station. The UE determines a first number of frames that are included in a hyper-frame based at least in part on the extended DRX configuration information and selects a hyper-frame number. The hyper-frame number is based at least in part on the extended DRX configuration information. The UE maintains a hyper-frame count and the hyper-frame count is incremented after each hyper-frame. The UE then goes into extended sleep mode and the UE determines a first wake up time and a second wake up time. The wake up times are based on the selected hyper-frame number and the synchronization error between a first cell and a second cell.

In one example, the first wake up time is based on frame timing of the first cell and the second wake up time is based on frame timing of the second cell.

In another example, the synchronization error between the first cell and the second cell is not greater than two seconds.

In a third example, the first cell neighbors the second cell and a calculation of the selected hyper-frame number includes a modulo calculation using an UE identity.

In a fourth example, the extended DRX configuration information includes the maximum synchronization error between the first cell and the second cell.

In a fifth example, when the UE does not observe a paging occasion, the UE applies standard DRX cycle to find the paging occasion.

In a sixth example, when the UE observes a paging occasion, the UE communicates data with the base station and after completing the communication, the UE goes into sleep extended sleep mode.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

In the current 3GPP system and specifications, a System Frame Number (SFN) scheme is used as a reference for DRX paging. The SFN scheme does not allow for very long sleep cycles because the SFN scheme only provides a limited number of frames. A radio frame is ten milliseconds long and the SFN scheme includes frame numbers ranging from one to one thousand and twenty-four. One thousand and twenty-four frames, at ten milliseconds per frame, corresponds to 10.24 seconds. Many UEs, including for example machine-to-machine UEs, can tolerate communication delays greater than ten seconds. However, this communication delay tolerance cannot be exploited using standard DRX paging because the maximum delay before a frame is repeated in SFN is only approximately ten seconds.

Furthermore, for very long sleep cycles there is a risk that paging will not work well in a non synchronized network due to the following problem scenarios: (i) an UE goes to sleep and then the UE wakes up again right before the UE's paging frame is available, (ii) an UE may go to sleep in a first cell then later wake up in a different cell that has a totally unrelated paging schedule, or (iii) an UE may go to sleep in a first cell then later wake up in a different cell that has a related, but not accurately synchronized, paging schedule. In the event that the UE misses the paging cycle, the UE has no way to synchronize with the network. This scenario may lead to very poor paging performance.

In one solution, an UE that is moving into another cell would wake up more often than required to ensure that paging occasions are not missed. However, such a solution is not desirable because it causes the UE to wake up more often, which contradicts the objective of increase sleep time. Increasing the frequency at which the UE wakes up to check geographical location and synchronization with its serving cell, decreases the amount of sleep time. Decreasing the UE's sleep time causes an increase in power consumption, which causes a decrease in battery life of the UE.

The present invention address the shortcomings of current wireless networks in providing extended sleep cycles, and thus improved power consumption and battery life, to UEs that can tolerate communication delays greater than ten seconds. A time reference, to determine wake up times and sleep times, can be used to schedule paging events that allow proper downlink communication.

In a first novel aspect, a "hyper-frame" is used as a time reference. A hyper-frame includes a predefined number of SFN frames.

In a second novel aspect, paging occasions are derived in a way that reuses existing legacy core network solutions.

In a third novel aspect, a method of hyper-frame synchronization between cells in a mobile network is described. The method of hyper-frame synchronization between cells is pragmatic and provides a flexible balance between UE power consumption and network complexity.

Herein, the terms "super-frame", "hyper-frame", and "hyper-system-frame" are used interchangeably. Accordingly, a hyper-system-frame number (H-SFN) also refers to a hyper-frame number and a super-frame-number.

Herein, the terms "extended DRX" and "long DRX" are used interchangeably.

Figure 1:
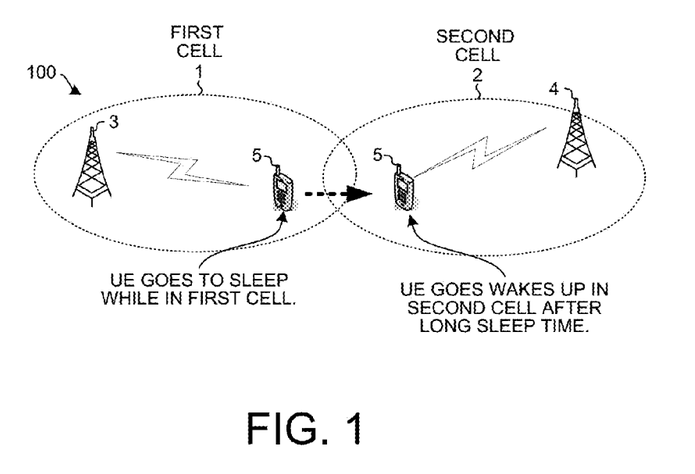
FIG. 1 illustrates an UE operating in extended DRX mode as the UE moves from a first cell to a second cell of a network.

FIG. 1 illustrates an exemplary wireless network 100 with improved methods in accordance with embodiments of the current invention. Wireless communications system 100 includes a first cell 1 and a second cell 2. The first cell 1 includes fixed base infrastructure unit 3. The second cell 2 includes fixed base infrastructure unit 4. The base infrastructure units may also be referred to as an access point, an access terminal, a base station, eNB, or by other terminology used in the art. Each of the base stations 1 and 1 serve a geographic area. The geographic area served by base infrastructure unit 1 neighbors the geographic area served by base infrastructure unit 2.

eNB 3 is a licensed base station that communicates with UE 5 via a licensed frequency band. In one example, eNB 3 communicates with UE 5 via Long-Term Evolution (LTE) wireless communication. eNB 3 provides wireless communication to multiple UEs within first cell 1. UE 5 is synchronized with eNB 3 and communicates data with eNB 3. Once UE 5 had completed the data communication UE 5 enters sleep mode.

Later in time, UE 5 wakes up to communicate additional data. When UE 5 wakes up, UE 5 is no longer in first cell 1, but rather is in second cell 2. UE 5 is not synchronized with second cell 2 and therefore cannot communication data with eNB 4 within second cell 2.

This example illustrates the problem of utilizing an extended DRX cycle for UE sleep when the UE travels from a first cell 1 to a second cell 2.

Figure 2:
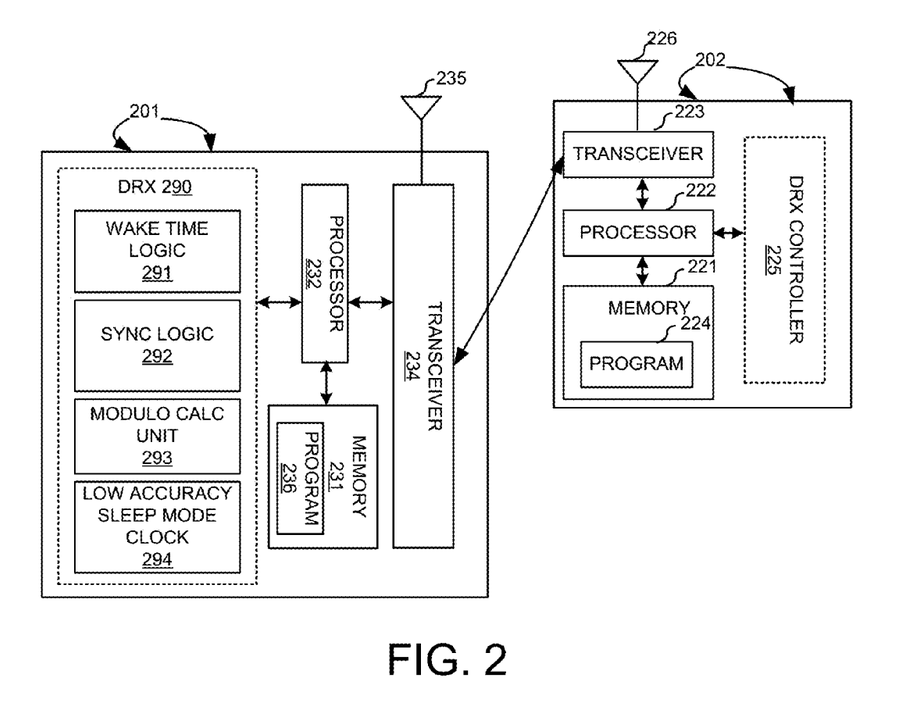
FIG. 2 illustrates an exemplary block diagram of a User Equipment (UE) and a base station (eNB) in accordance with embodiments of the current invention.

FIG. 2 illustrates the various components included in a UE 201 and a base station 202. Base station 202 may have an antenna array 226 comprising one or more antennas, which transmit and receive radio signals. A RF transceiver module 223, coupled with the antenna, receives RF signals from antenna array 226, converts them to baseband signals and sends them to processor 222. RF transceiver 223 also converts received baseband signals from processor 222, converts them to RF signals, and sends out to antenna array 226. Processor 222 processes the received baseband signals and invokes different functional modules to perform features in base station 202. Memory 221 stores program instructions and data 224 to control the operations of base station 202. Base station 202 also includes a set of control modules, DRX controller 225 that carries out functional tasks to configure, schedule, execute and communicate with the UE 201 for DRX tasks such as described in detail below.

UE 201 has an antenna array 235 with a single antenna, which transmits and receives radio signals. A RF transceiver module 234, coupled with the antenna, receives RF signals from antenna array 235, converts them to baseband signals and sends them to processor 232. RF transceiver 234 also converts received baseband signals from processor 232, converts them to RF signals, and sends out to antenna 235. Processor 232 processes the received baseband signals and invokes different functional modules to perform features in mobile station 201. Memory 231 stores program instructions and data 236 to control the operations of UE 201.

UE 201 also includes a set of DRX control modules that carry out functional tasks. Wake up time logic 291 determines when UE 201 is to wake up from an extended DRX sleep cycle. Synchronization logic 292 configures the DRX operation based on synchronization information received from the base station 202. The modulo calculation unit 293 performs modulo calculation that aid in the determination of UE wake up times. The low accuracy sleep mode clock 294 is also used to aid in the determination of UE wake up times. When the UE enters sleep mode (for power consumption) all modules can be turned off, except for a low accuracy sleep mode clock 294. Low accuracy sleep mode clock 294 keeps approximate time, such that the UE 201 can wake up in time to receive paging from the network. The algorithms that determine when the UE shall awake, go to sleep or stay asleep are implemented by software (program) 236 executed in the processor 232 and stored in the memory 231.

Figure 3:
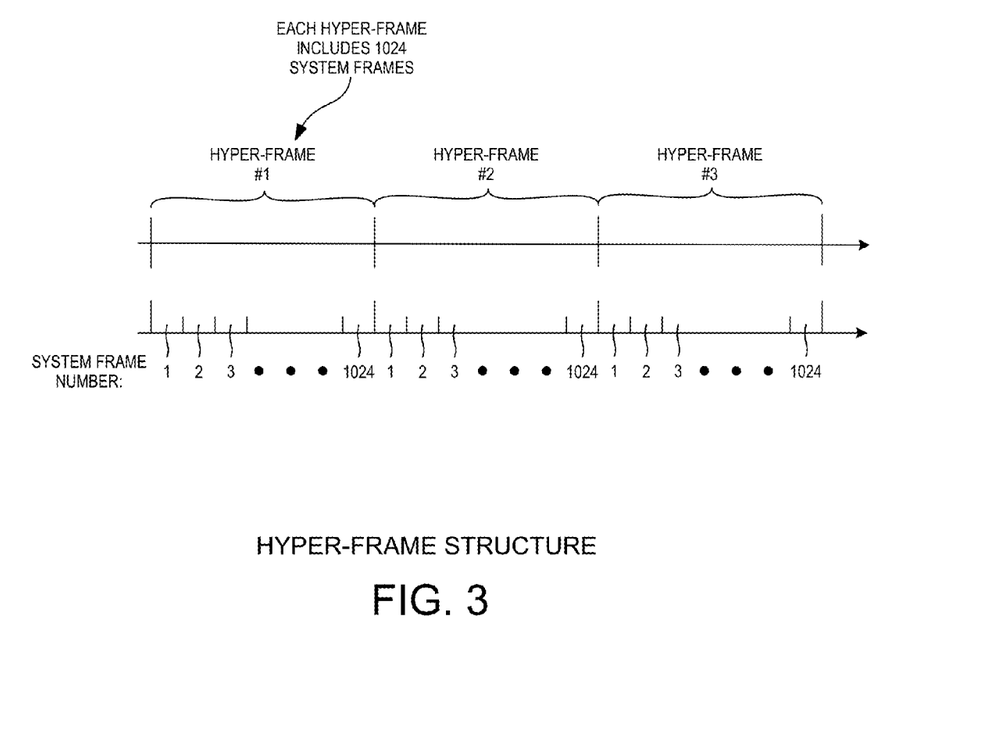
FIG. 3 illustrates the relationship between an extended DRX cycle and a standard DRX cycle.

FIG. 3 illustrates the relationship of a hyper-frame to the standard System Frame Number (SFN). More specifically, FIG. 3 shows that multiple system frames are included in a single hyper-frame. In the example shown in FIG. 3, each hyper-frame includes one thousand and twenty-four system frames. It is noted herein, that the inclusion of one thousand and twenty-four system frames is only for example and any other number of system frames can be included in a hyper-frame and would still fall within the scope of the present invention. The grouping of multiple system frames into a single hyper-frame provides the benefit of reducing the number of frames that need to be counted during an extended sleep cycle. For example, instead of counting three thousand and seventy-two system frames, only three hyper-frames need to be counted to measure the same amount of time.

This solution achieves an extended DRX cycle by use of a hyper-frame number and a system hyper-frame number count. Each hyper-frame includes the duration of a complete SFN count until wrap-around (e.g. from one to one thousand and twenty-four). Compared to use of an absolute time reference, the hyper-frame count has the benefit that the framing information can be provided to the UE 201 by System information broadcast via the radio interface 235 from the eNB 202, and thus it is easy for the UE 201 to acquire this without much additional power consumption, as the UE 210 already needs to acquire the SFN. Also, the hyper-frame count solution builds on the current SFN concept and the UE 201 can often keep the more course hyper-frame count via dead reckoning by a very inexpensive clock 294 while sleeping for longer times, and can normally re-synchronize by only reading the SFN via system information broadcast. Due to the close relation between SFN and hyper-frame, the UE 201 would need to re-read the hyper-frame information very rarely from the system information broadcast.

Figure 4:
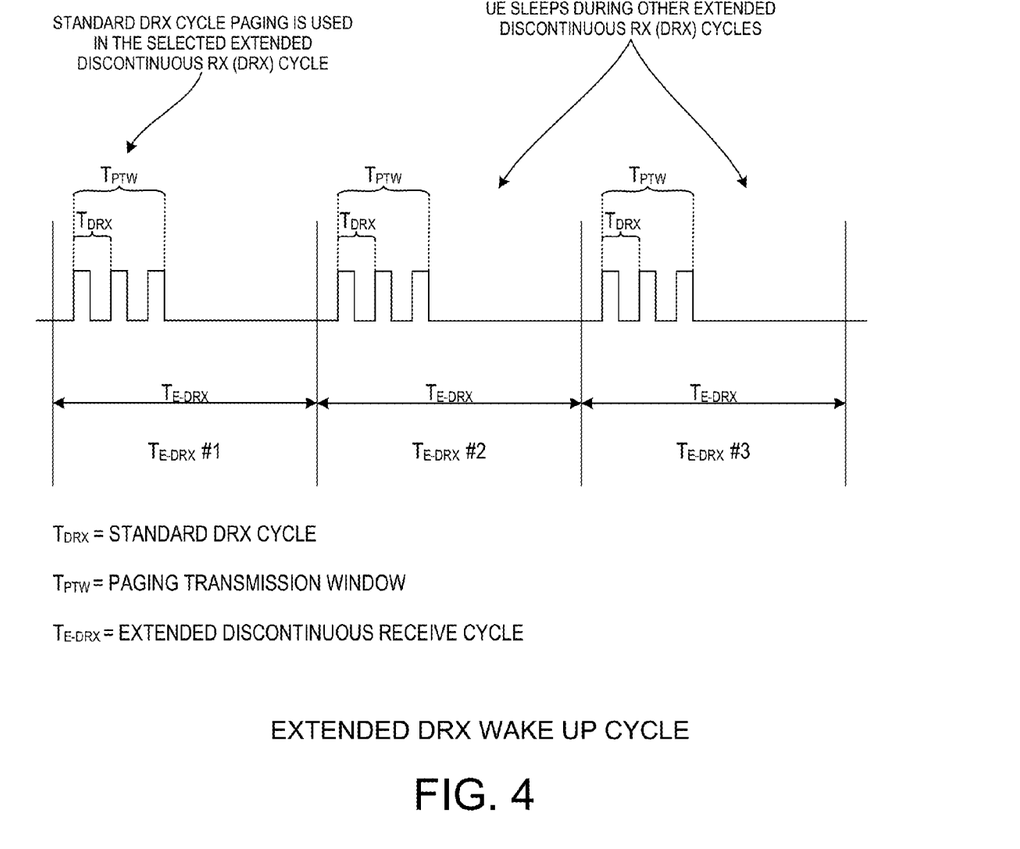
FIG. 4 illustrates paging during an extended DRX cycle.

FIG. 4 illustrates the paging occasions for a UE 201 in extended DRX mode as a function of time. More specifically, FIG. 4 shows three extended DRX cycles (#1-3). Each extended DRX cycle includes a paging transmission window. Each paging transmission window includes multiple standard DRX cycles. In one example, when operating in extended DRX mode, the UE uses the standard DRX cycles within the paging transmission window of one selected extended DRX cycle to perform network synchronization. The UE ignores all other standard DRX cycles in all other extended DRX cycles to maximize sleep time. Given that each extended DRX cycles is greater than ten seconds, the use of three extended DRX cycles (as shown in FIG. 4) allows for more than twenty seconds of sleep time. Twenty seconds of sleep time is more than double the maximum previously achievable sleep time of approximately ten seconds. Doubling the sleep time of a UE approximately doubles the amount of power savings achieved by the UE.

A paging occasion is a point in time or a duration of time. During the paging occasion, in order to receiving the paging signal, the UE 201 need to be awake, synchronized and with its transceiver 234 tuned to the downlink channel of the camped cell. In FIG. 4, this is illustrated by the logic high level. The logic low level illustrates all the points in time that are non-paging occasions. During non-paging occasions, the UE 201 is not required to be awake and can thus sleep, with some exceptions. For example, the UE 201 may need to wake up to resynchronize SFN and/or hyper-frame number. In another example, UE 201 needs to wake up to receive other system information. One fundamental already existing principle for paging is that the core network retransmits paging in case a UE 201 does not respond, and that the network may escalate and page smartly in increasingly larger areas, or increasingly deeper coverage for each attempt in order to reach the UE 101 with minimum resource consumption.

In one embodiment, shown in FIG. 4, the existing paging DRX is re-used, with the existing standard DRX cycle. The UE 201 wakes up on a time magnitude of once every second or so in order to support existing smart paging reattempt strategies. To apply extended DRX, the UE only applies the existing standard DRX during certain paging transmission windows. The paging transmission windows occur once during an extended DRX cycle. In this embodiment, the UE is only paged during hyper-frames that are identified as paging hyper-frames. Paging hyper-frames are identified by a modulo calculation using the UE identity. For example, the Paging Hyper-Frame (PH) could be identified as any hyper-frame where the Hyper-Frame number mod TeDRX equals the UE identification mod TeDRX. The UE_ID could be IMSI (International Mobile Subscriber Identity) or a truncated variant (such as IMSI mod one thousand twenty-four). TeDRX would be the extended DRX cycle of the UE in hyper-frames (i.e. TeDRX=1, 2, 3, 4, 5 . . . Hyper-frames). The benefit of such calculation is simplicity and reuse of the parameter UE_ID and IMSI that is already used in legacy calculations to determine paging occasion for the existing standard DRX.

Figure 5:
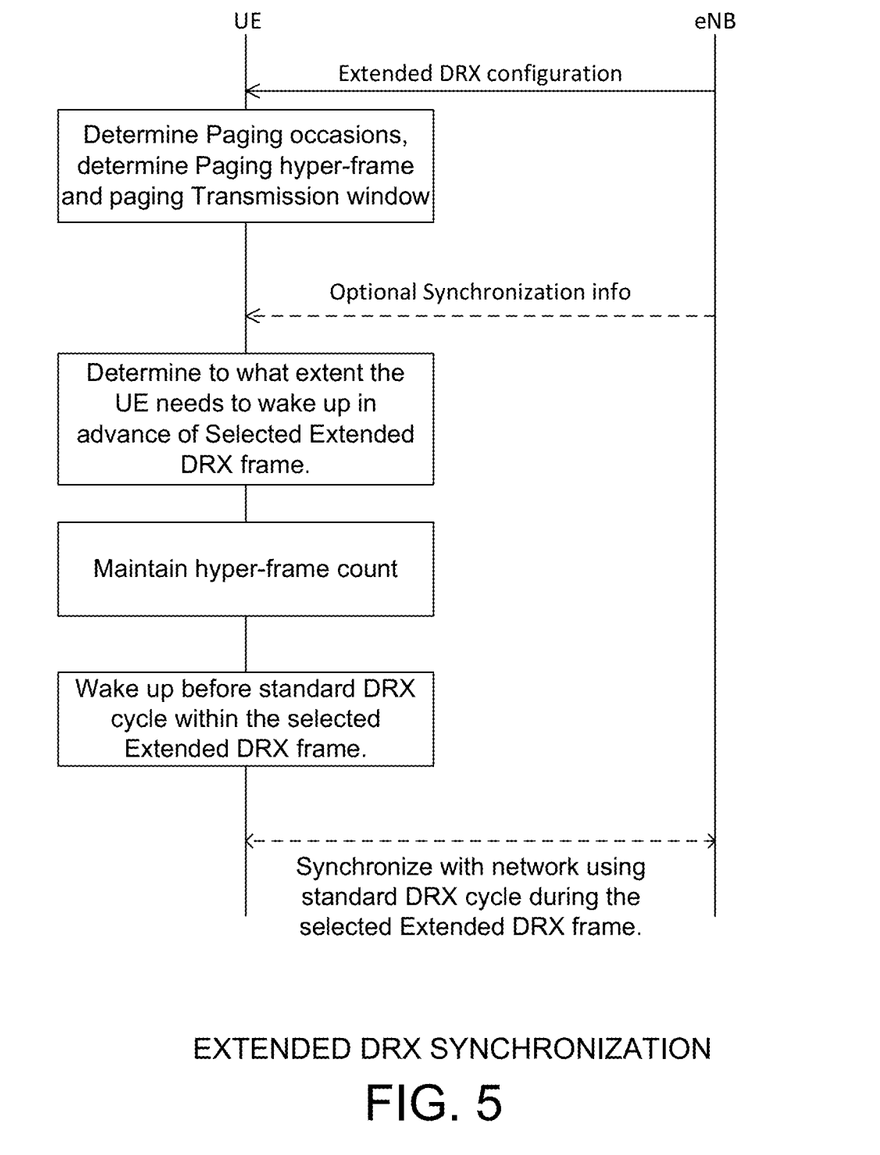
FIG. 5 illustrates signaling between an UE and an eNB using an extended DRX cycle.

FIG. 5 illustrates signaling between an UE and an eNB using an extended DRX cycle. Extended DRX configuration information is communicated from the eNB to the UE. The UE then determines paging occasions, paging hyper-frame and paging window based at least in part on the extended DRX configuration. Optionally, the eNB then communicates optional synchronization information to the UE. The UE then determines to what extent the UE needs to wake up in advance of the selected extended DRX frame. The UE counts all hyper-frames and maintains a hyper-frame count. The UE then wakes up before the standard DRX cycle within the selected extended DRX frame. The UE then synchronizes with the eNB using the standard DRX cycle within the selected extended DRX frame.

The UE needs DRX configuration information in order to deduce when the UE is required to be awake. In addition to current DRX configuration information, information about the extended DRX cycle (TeDRX) and the information to derive the start and length of the paging transmission window (PTW).

Furthermore, as indicated in FIG. 5, the UE may need synchronization information in order to determine to what extent the UE may need to wake up. The UE may also need the synchronization information determine paging occasions. To avoid missing paging due to moving from a first cell to a second cell (as shown in FIG. 1), two strategies could be applied. In the first strategy, the UE wakes up often to make sure that it is synchronized with the currently strongest cell so paging can be received. The required rate of additional wake ups would depend on the UE mobility indicating the expected rate of cell changes. In the second strategy, the various cells in the network are kept synchronized, such that the paging occasions occur at the same time for a UE in different cells.

In case the SFN could be completely synchronized between cells, the UE 201 could know exactly when to wake up regardless of in which cell the UE wakes up. This case is only limited by the accuracy of the UE's internal clock 294. This case would be the most efficient mode of operation with respect to the power consumption of UE 201. However, radio frame level (SFN level) inter-eNB synchronization is potentially expensive. The synchronization may require a high quality backhaul or external synchronization such as GPS synchronization. For network simplicity, SFN is not normally required to be synchronized between eNBs 3 and 4. Therefore, some networks will not be able to implement this synchronization between different cells.

As shown in FIG. 5, it could be signaled to the UE 210 (e.g. in system information broadcast across the air interface) that the cells in the current area are SFN synchronized. The UE 201 could then use this information to achieve power saving by always waking up just in time for paging without requirements for pre-wakeup to achieve synchronization first.

In another embodiment, when the UE knows that it has not moved outside the current cell, the UE can apply additional power saving by only waking up exactly at paging occasions without requirements for pre-wakeup to achieve synchronization first. This principle could also be applied while a UE is stationary, even though there could be some likelihood that the UE may move.

However, as it is expected that many networks cannot support inter cell synchronization on SFN level (i.e. on 10 ms level) a flexible solution is needed to support those networks as well.

Figure 6:
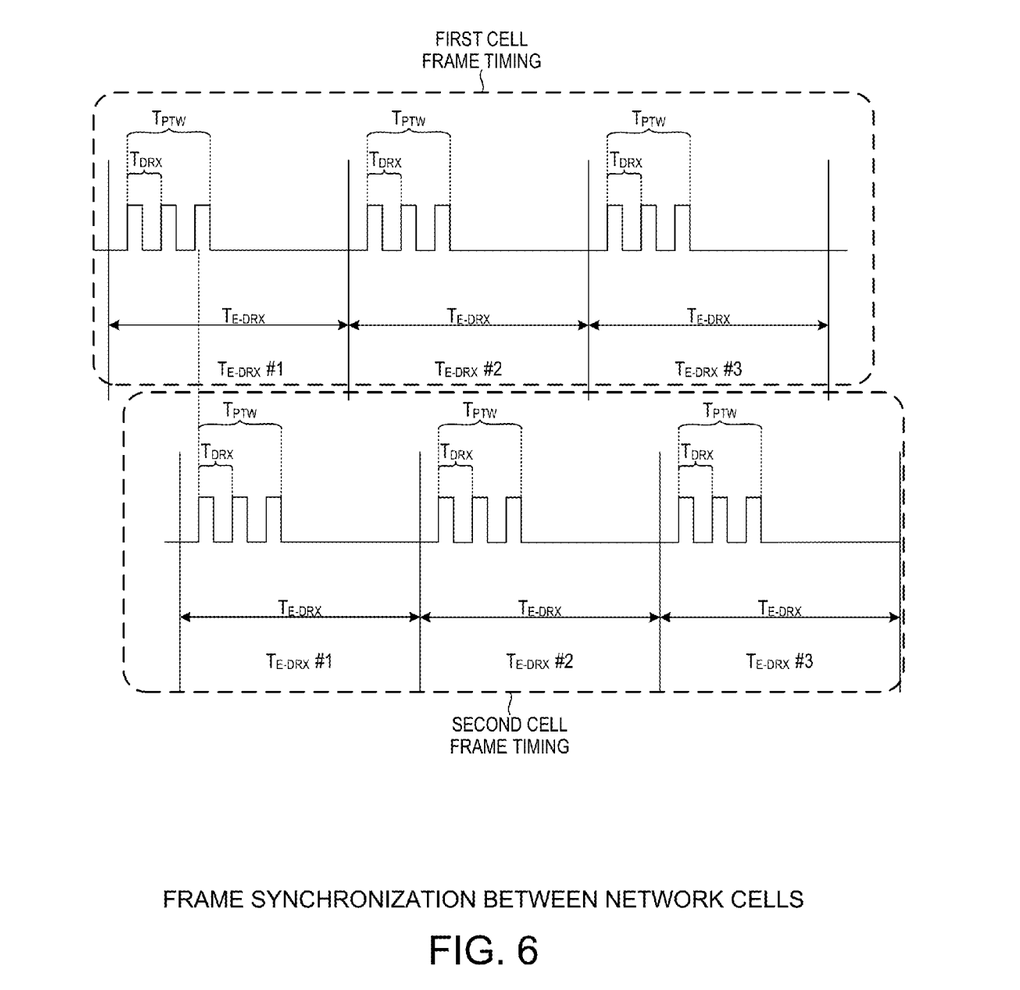
FIG. 6 illustrates non-exact synchronization between network cells that is required for extended DRX operation.

FIG. 6 is illustrates frame synchronization between two different cells. In the example shown in FIG. 6, there is time offset between the frame signaling of cell 1 and the frame signaling of cell 2. The frames of cell 2 lag the frames of cell 1 by multiple frames.

In one embodiment, the hyper-frame number can be loosely synchronized in time. The UE can limit its increased wake up frequency to the hyper frame(s) when paging may be received (e.g. if the UE knows that the offset or skew in time is limited between the first cell 1 and the second cell 2. The UE can use this information to add a wake up time when a certain paging hyper-frame may occur in a certain cell and its neighbors, but not during other timer periods.

In another embodiment, the time difference of hyper-frame N (e.g. when N=0) of different cells or different eNBs is limited to around one to two seconds, across all eNBs. This would allow the network to run a not very tight synchronization scheme, and would allow UE implementations that only wakes up at one additional time before the paging occasion for resynchronization.

Figure 7:
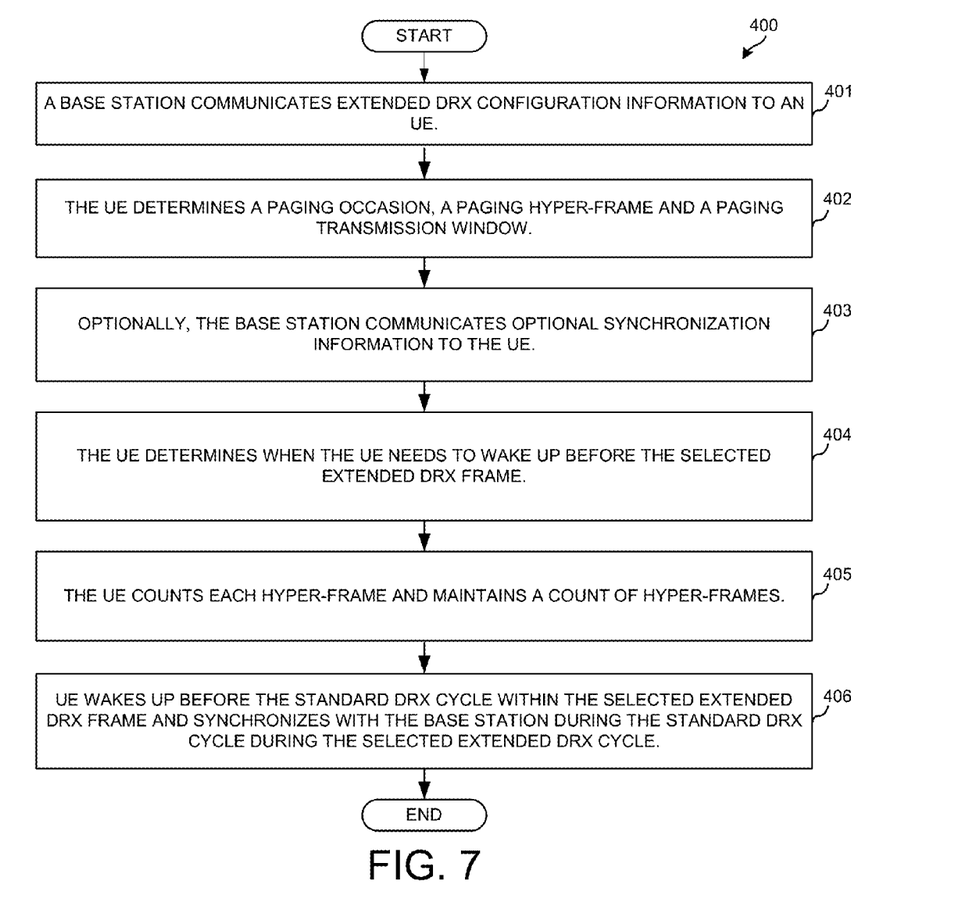
FIG. 7 is a flowchart describing an example of paging between an UE and eNB during extended DRX operation.

FIG. 7 is a flowchart 400 describing an example of paging between an UE and eNB during extended DRX operation.

In step 401, a base station communicates extended DRX configuration information to an UE. In step 402, the UE determines a paging occasion, a paging hyper-frame and a paging transmission window. In step 403, optionally, the base station communicates optional synchronization information to the UE. In step 404, the UE determines when the UE needs to wake up before the selected extended DRX frame. In step 405, the UE counts each hyper-frame and maintains a count of hyper-frames. In step 406, the UE wakes up before the standard DRX cycle within the selected extended DRX frame and synchronizes with the base station during the standard DRX cycle during the selected extended DRX cycle.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   (a) a User Equipment (UE) receives an extended DRX configuration from a Cell;
   (b) the User Equipment (UE) receives a Hyper Frame from an eNB in the Cell and maintains a count of Hyper Frames; and
   (c) the UE determines a set of one or more times when the UE is required to wake up from sleep mode to receive Downlink transmission in the Cell by applying the extended DRX configuration with the count of Hyper Frames in the Cell, wherein the UE selects a Hyper Frame for the set of one or more times when the UE is required to wake up from sleep mode to receive Downlink transmission in the Cell, and wherein a calculation to identify the selected Hyper Frame number includes a modulo calculation using an UE identity, wherein the UE within a selected Hyper Frame applies a legacy paging occasion calculation to determine the set of one or more times when the UE is required to wake up from sleep mode to receive Downlink transmission in the Cell.

2. The method of claim 1, wherein the UE increments the count of Hyper Frames after each Hyper Frame is received.

3. The method of claim 1, wherein the UE enters or stays in sleep mode whenever the UE is in idle mode, and is not required to wake up from sleep mode receive downlink transmissions, or is in sleep mode for other actions related to requirements for idle mode.

4. The method of claim 1, wherein a Hyper Frame includes only one thousand and twenty-four frames.

5. The method of claim 1, wherein the UE includes a wake time logic module, a synchronization module, a modulo calculation module, and a low accuracy sleep mode clock.

6. The method of claim 1, wherein the UE is a machine-to-machine communication device that can tolerate communication delays greater than ten seconds.

7. A method, comprising:
   (a) a User Equipment (UE) receiving an extended DRX configuration from a network;
   (b) the User Equipment (UE) receiving a Hyper Frame from an eNB in a Cell and maintaining a count of Hyper Frames;
   (c) the UE determining a set of one or more times when the UE is required to wake up from sleep mode to receive Downlink transmission in the Cell, by applying the extended DRX configuration with the count of Hyper Frames in the Cell, wherein the UE selects a Hyper Frame for which there are one or more times when the UE is required to wake up from sleep mode to receive Downlink transmission in the Cell, wherein a calculation to identify the selected Hyper Frame number includes a modulo calculation using an UE identity, and wherein the UE within a selected Hyper Frame applies a legacy paging occasion calculation to determine the one or more times when the UE is required to wake up from sleep mode to receive Downlink transmission in the Cell; and
   (d) the User Equipment (UE) applying inter-cell synchronization error information.

8. The method of claim 7, wherein the UE determines a wake up time based on the selected Hyper Frame number and the inter-cell synchronization error between a first cell and a second cell, and wherein the wake up time is chosen such that the UE will not miss paging occasions even though the UE has moved between the first and the second cell.

9. The method of claim 8, wherein the UE will wake up X time in advance of its calculated paging occasion, and wherein the X time is the synchronization error in time between the first cell and the second cell.

10. The method of claim 7, wherein the synchronization error between the first cell and the second cell is not greater than two seconds.

11. The method of claim 7, wherein a signaled configuration information includes the maximum synchronization error between the first cell and the second cell.

12. The method of claim 7, wherein the Hyper Frame includes exactly one thousand and twenty-four frames.

13. The method of claim 7, wherein when the UE is stationary or semi-stationary the UE does not need to take into account synchronization errors between cells, or can assume that synchronization error is zero.

* * * * *